United States Patent
Fischer et al.

(10) Patent No.: US 7,089,101 B2
(45) Date of Patent: Aug. 8, 2006

(54) METHOD FOR ASSISTING A DRIVER WHEN PERFORMING DRIVING MANEUVERS

(75) Inventors: Eckart Fischer, Stuttgart (DE); Helmut Keller, Korb (DE); Jens Koehnlein, Stuttgart (DE); Jakob Seiler, Stuttgart (DE); Andreas Spieker, Stuttgart (DE); David Ulmer, Schoenaich (DE); Andy Yap, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/522,038

(22) PCT Filed: Jun. 25, 2003

(86) PCT No.: PCT/EP03/06694

§ 371 (c)(1),
(2), (4) Date: Jul. 19, 2005

(87) PCT Pub. No.: WO2004/007232

PCT Pub. Date: Jan. 22, 2004

(65) Prior Publication Data
US 2006/0025893 A1      Feb. 2, 2006

(30) Foreign Application Priority Data
Jul. 16, 2002   (DE) ............................... 102 32 295

(51) Int. Cl.
*G06F 7/70*     (2006.01)
*G06F 19/00*    (2006.01)
*B62D 6/04*     (2006.01)
*B60K 31/00*    (2006.01)
*B60T 7/12*     (2006.01)

(52) U.S. Cl. ............................ 701/41; 701/70; 701/72; 701/300; 180/413; 180/443; 180/446; 180/447; 303/140

(58) Field of Classification Search .................. 701/41, 701/48, 70, 42, 72, 300; 180/413, 443, 446, 180/447; 303/140
See application file for complete search history.

(56) References Cited

U.S. PATENT DOCUMENTS 4,313,514 A * 2/1982 Furukawa et al. .......... 180/446
(Continued)

FOREIGN PATENT DOCUMENTS

DE      38 13 083      11/1989
(Continued)
(Continued)

OTHER PUBLICATIONS

Chun J et al., Realization of guiding a tractor to implement positions, Jour. of the Japanese Society of Agricultural Machinery, 2004, vol. 66 No. 5, pp. 83–89 (from Dialog(R) File 94, acc. No. 05862097).*

*Primary Examiner*—Cuong Nguyen
(74) *Attorney, Agent, or Firm*—W. F. Fasse; W. G. Fasse

(57) ABSTRACT

The invention relates to a method for assisting the driver of a vehicle (10) when performing a driving maneuver, such as a parking or shunting maneuver. In this case, a reference trajectory (16) is determined, along which the vehicle (10) is to be moved. A steering wheel position to be set and controlling the vehicle along the reference trajectory (16) is indicated to the driver during the driving maneuver. The vehicle longitudinal speed is influenced independently of the driver in the event of a steering angle deviation between the actual steering angle actually set by the driver and the desired steering angle corresponding to the requested steering wheel position.

Figure 1:
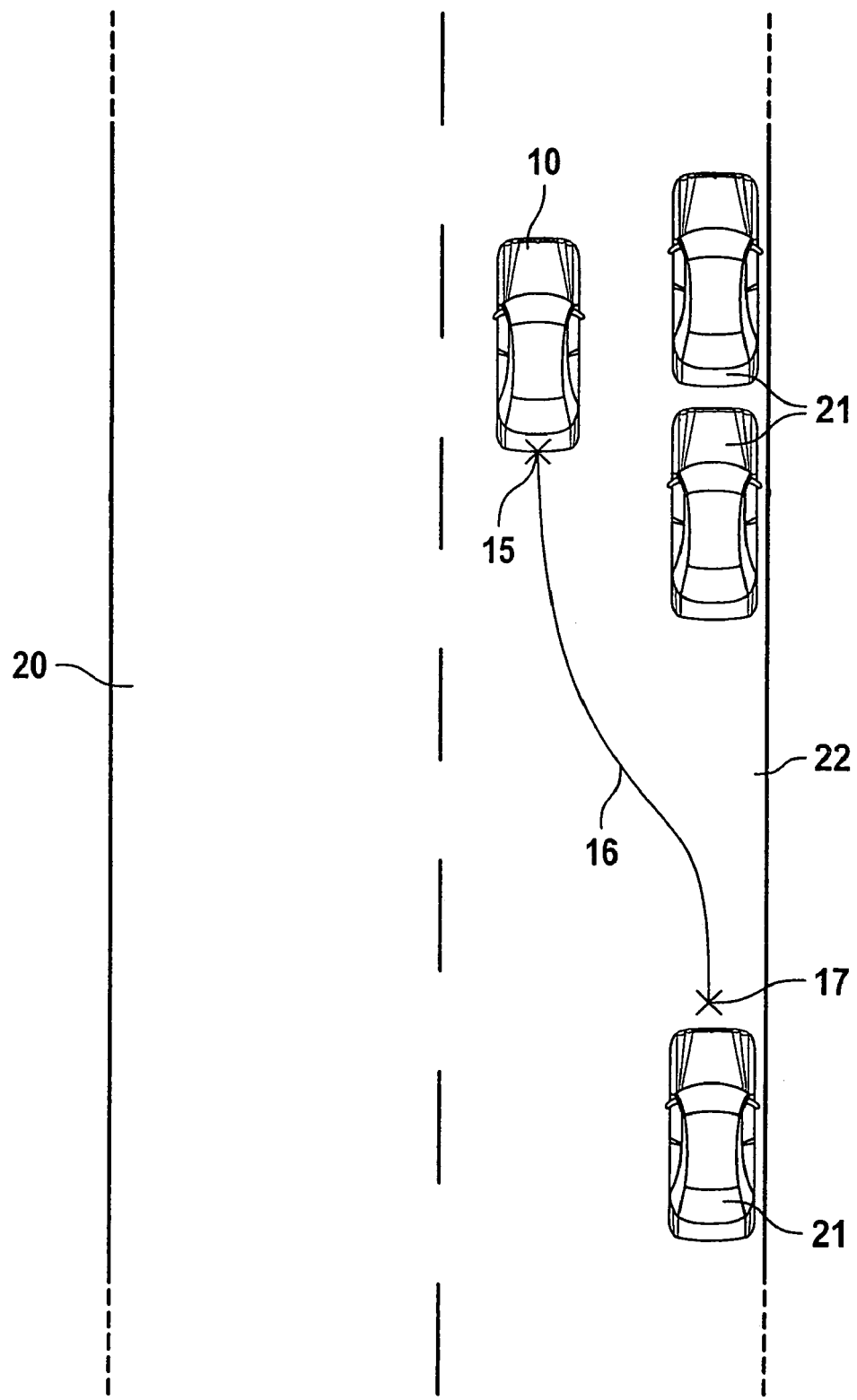

As a result, the driver can be given a greater reaction time in order to set the indicated steering wheel position.

14 Claims, 5 Drawing Sheets

U.S. PATENT DOCUMENTS

| | | | |
|---|---|---|---|
| 4,931,930 A | 6/1990 | Shyu et al. | |
| 5,018,594 A * | 5/1991 | Takahashi et al. | 180/412 |
| 5,615,117 A * | 3/1997 | Serizawa | 701/42 |
| 5,850,616 A * | 12/1998 | Matsuno et al. | 701/82 |
| 5,944,137 A * | 8/1999 | Moser et al. | 180/446 |
| 6,122,584 A * | 9/2000 | Lin et al. | 701/70 |
| 6,342,832 B1 | 1/2002 | Fuchs et al. | |
| 6,553,293 B1 * | 4/2003 | Hac | 701/42 |
| 6,580,988 B1 * | 6/2003 | Lin et al. | 701/41 |
| 6,622,076 B1 | 9/2003 | Eckert et al. | |
| 6,654,670 B1 | 11/2003 | Kakinami et al. | |
| 6,675,096 B1 * | 1/2004 | Matsuura | 701/301 |
| 6,865,468 B1 * | 3/2005 | Lin et al. | 701/70 |
| 2002/0156581 A1 * | 10/2002 | Matsuura | 701/301 |
| 2004/0153228 A1 * | 8/2004 | Matsumoto et al. | 701/41 |
| 2004/0158377 A1 * | 8/2004 | Matsumoto et al. | 701/48 |
| 2006/0025893 A1 * | 2/2006 | Fischer et al. | 701/1 |

FOREIGN PATENT DOCUMENTS

| | | |
|---|---|---|
| DE | 38 44 340 | 7/1990 |
| DE | 197 15 622 | 10/1998 |
| DE | 197 45 127 | 4/1999 |
| DE | 198 09 416 | 9/1999 |
| DE | 199 16 267 | 10/2000 |
| DE | 100 15 897 | 11/2000 |
| DE | 199 33 732 | 1/2001 |
| DE | 199 40 007 | 3/2001 |
| DE | 100 19 817 | 10/2001 |
| FR | 2 785 383 | 5/2000 |
| JP | 2001001928 A * | 1/2001 |
| JP | 2003141694 A * | 5/2003 |
| JP | 2004338638 A * | 12/2004 |
| JP | 2005313775 A * | 11/2005 |

* cited by examiner

METHOD FOR ASSISTING A DRIVER WHEN PERFORMING DRIVING MANEUVERS

The invention relates to a method for assisting a driver when performing driving maneuvers, according to the preamble of patent claim 1.

Such a method emerges, for example, from DE 198 09 416 A1, which discloses a method for assisting the driver when parking. During the driving maneuver, the parking strategy is communicated to the driver via an optical display device, an acoustic speech output device or a tactile steering wheel, so that the driver can park in the parking gap, following the parking strategy.

Furthermore, it is known, for example from DE 197 45 127 A1, to initiate an automatic braking operation when the distance between the vehicle and an object falls below a limiting value. The intention is to avoid a collision with the obstacle in this way.

The generic method has the disadvantage that the reactions of the driver to the instructions about the steering wheel position to be set cannot be predicted. The driver is incorporated in the control loop and, so to speak, represents a disturbance variable. In particular during difficult driving maneuvers, such as reverse parking into a parking gap at the edge of the road, parallel to the edge of the road (what is known as parallel parking), it is difficult for the driver to set the steering wheel position respectively requested by the instruction during the driving maneuver.

It is therefore the object of the present invention to develop a method and a device for implementing the method of the generic type in such a way that it is made easier for the driver to set the steering wheel position requested by means of the instruction.

This object is achieved by the features of patent claims 1 and 13.

According to the invention, the vehicle longitudinal speed is influenced independently of the driver when there is a steering angle deviation between the actual steering angle actually set by the driver via the steering wheel and the desired steering angle corresponding to the requested steering wheel position.

If there is such a steering angle deviation, then, during the driving maneuver, the vehicle departs from the ideal line predefined by the reference trajectory. The vehicle longitudinal speed is then reduced in order to provide the driver with sufficient time to steer the vehicle again into a vehicle position predefined by the reference trajectory.

Advantageous refinements of the method according to the invention and the device according to the invention emerge from the dependent patent claims.

The influence on the vehicle longitudinal speed is advantageously dependent on the magnitude of the steering angle deviation. The greater the steering angle deviation, the more intensely is the vehicle retarded, in order to reduce the vehicle longitudinal speed.

During the driving maneuver, depending on the actual vehicle position, a steering angle tolerance band defining the permissible steering angle can be determined and the influence on the vehicle longitudinal speed can depend on the tolerance margin between the requested desired steering angle to be set by the driver and the tolerance band limits. The lower the tolerance margin between the desired steering angle and a tolerance band limit, the more intensely must the vehicle speed be reduced if the driver sets an actual steering angle via the steering wheel position which lies between the desired steering angle and the relevant tolerance band limit.

Here, there is a possibility, in order to determine the steering angle tolerance band, of determining a rotational angle tolerance band, the actual rotational angle between the vehicle longitudinal axis and a coordinate axis of a stationary coordinate system being enlarged or reduced until it is still just possible to determine a trajectory to the target position by computation. During the determination of the trajectory, the same determination method can be used as that when determining the reference trajectory at the starting point of the vehicle. In this case, so to speak, two limiting trajectories would be calculated which, as viewed in the driving maneuver direction of travel starting from the actual vehicle position, represent a maximum possible left-hand limiting trajectory and a maximum possible right-hand limiting trajectory, along which the vehicle can still be moved to the target position. In this case, the determination of the limiting trajectories also depends on the minimum radius which can be traveled on account of the vehicle geometry and whether there are obstacles in the vehicle surroundings which have to be passed.

The greater the magnitude of the steering angle deviation and/or the smaller the magnitude of the tolerance margin, the lower is the vehicle longitudinal speed selected and set by means of appropriate control or regulation actions.

Advantageously, the vehicle will be retarded down to a standstill and kept at a standstill for as long as, on account of the steering angle deviation present, the vehicle would assume during further travel a position from which the target position can no longer be reached without shunting interruptions to the driving maneuver. If, as based on the actual vehicle position, no rotational angle deviations or only very small rotational angle deviations from the actual rotational angle of the vehicle can be permitted, then the vehicle longitudinal speed will be predefined as very low and the vehicle will immediately be brought to a standstill if the driver predefines a steering wheel position which, in the event of traveling onward with this steering wheel position predefined by the driver, would bring the vehicle into a vehicle position from which a trajectory to the target position can no longer be determined. This ensures that the driving maneuver does not have to be interrupted by shunting maneuvers and restarted. Beginning from a standstill, the vehicle is accelerated again if a permissible steering wheel position and therefore a permissible actual steering angle has been set by the driver.

Advantageously, the steering wheel position to be set is communicated to the driver through acoustic driver information and/or optical driver information and/or tactile driver information. For the purpose of tactile driver information, for example, the steering wheel torque can be varied. In this case it is conceivable, for example, for the rotation of the steering wheel toward the requested steering wheel position to be made easier and/or the rotation away from the requested steering wheel position to be made more difficult. For this purpose, for example, the servo motor which is present in any case in a power steering system can be used.

The driving maneuver to be carried out can, for example, be a parking maneuver, the reference trajectory specifying the ideal route from the starting position of the vehicle or the actual vehicle position into the desired parking position. It is precisely during parking maneuvers that driver assistance is desirable, in particular for inexperienced car drivers or for car drivers who are not used to a new or seldom used vehicle. They are quite generally driving maneuvers with a vehicle longitudinal speed below a speed threshold value of, for example, 10 km/h.

It is furthermore of advantage if, in the case of a vehicle in trailer operation, each vehicle position along the reference trajectory is assigned a desired trailer angle between the vehicle longitudinal axis and the trailer longitudinal axis and if the actual trailer angle is determined and compared with the corresponding desired trailer angle, in the event of an angular deviation between the desired trailer angle and the actual trailer angle, the vehicle longitudinal speed being influenced independently of the driver. Here, an angular deviation between the desired trailer angle and actual trailer angle is additionally taken into account. In addition, in the event of the angular deviation between the actual trailer angle and the desired trailer angle, speed control can be carried out as a function of the magnitude of the angular deviation. Furthermore, it would also be possible to select the driver-independent vehicle retardation to be greater, the greater the magnitude of the angular deviation.

Figure 2:
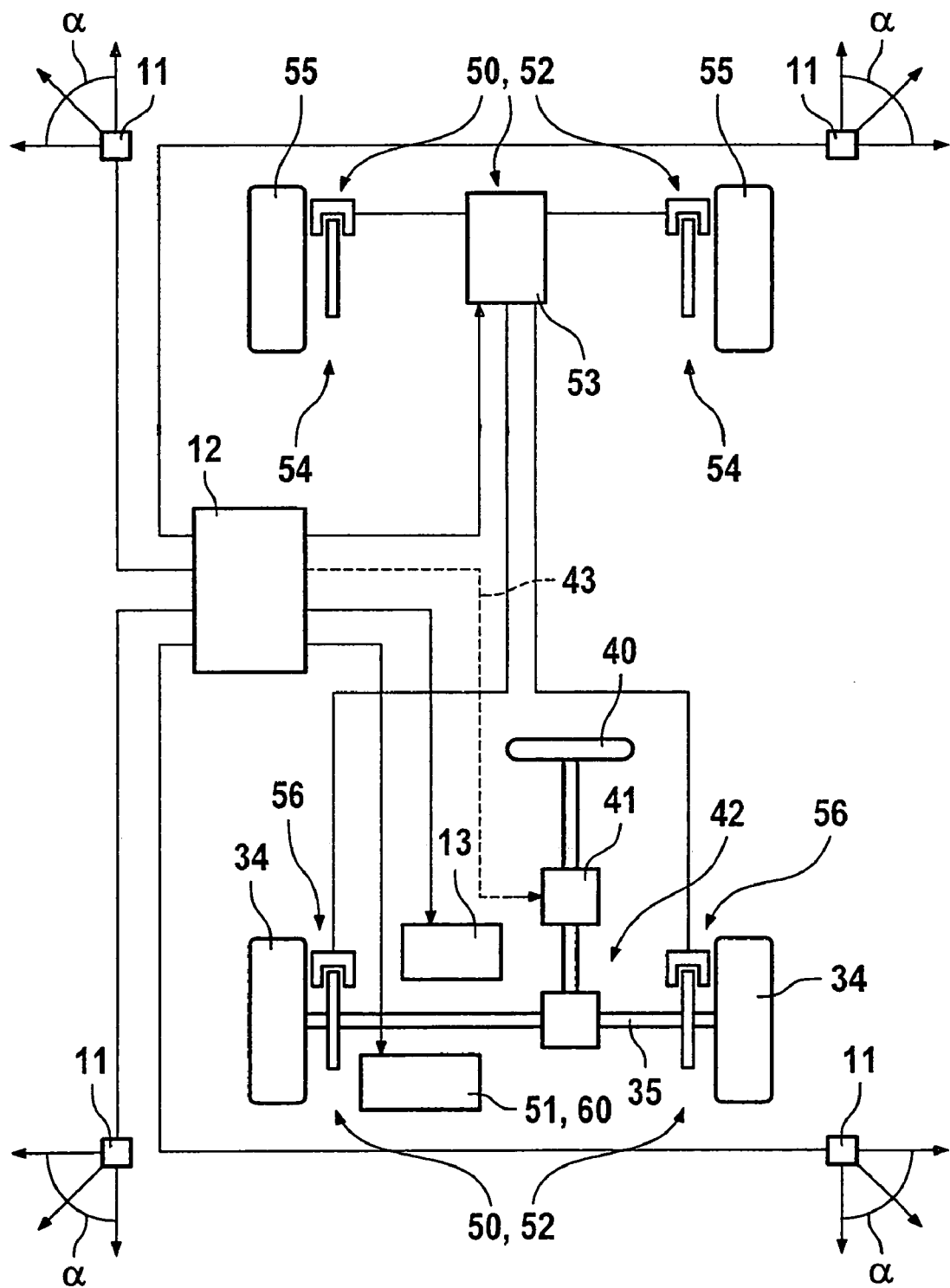
Figure 3A:
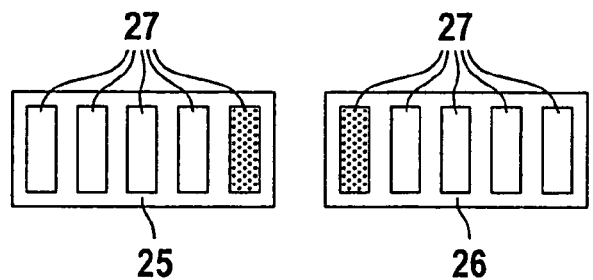
Figure 3B:
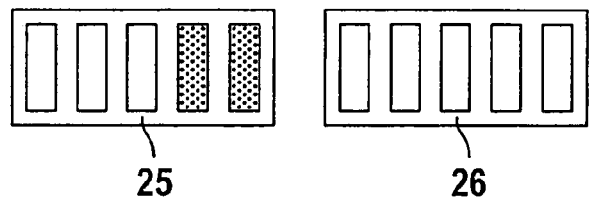
Figure 3C:
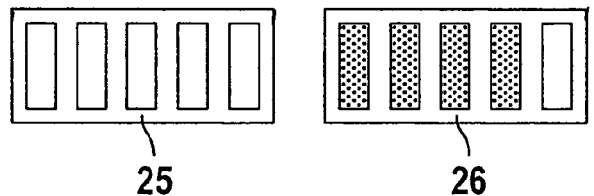
Figure 4:
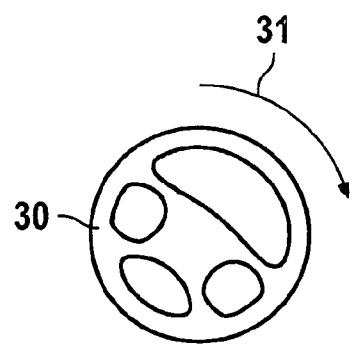
Figure 5:
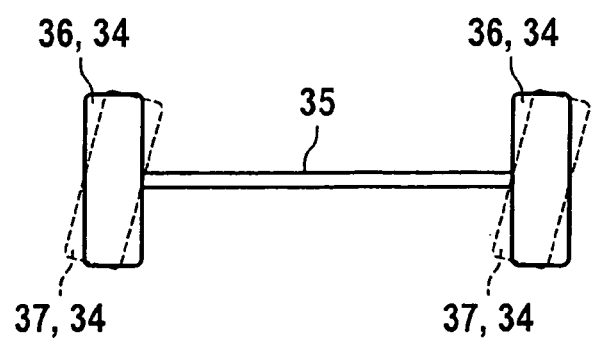
Figure 6A:
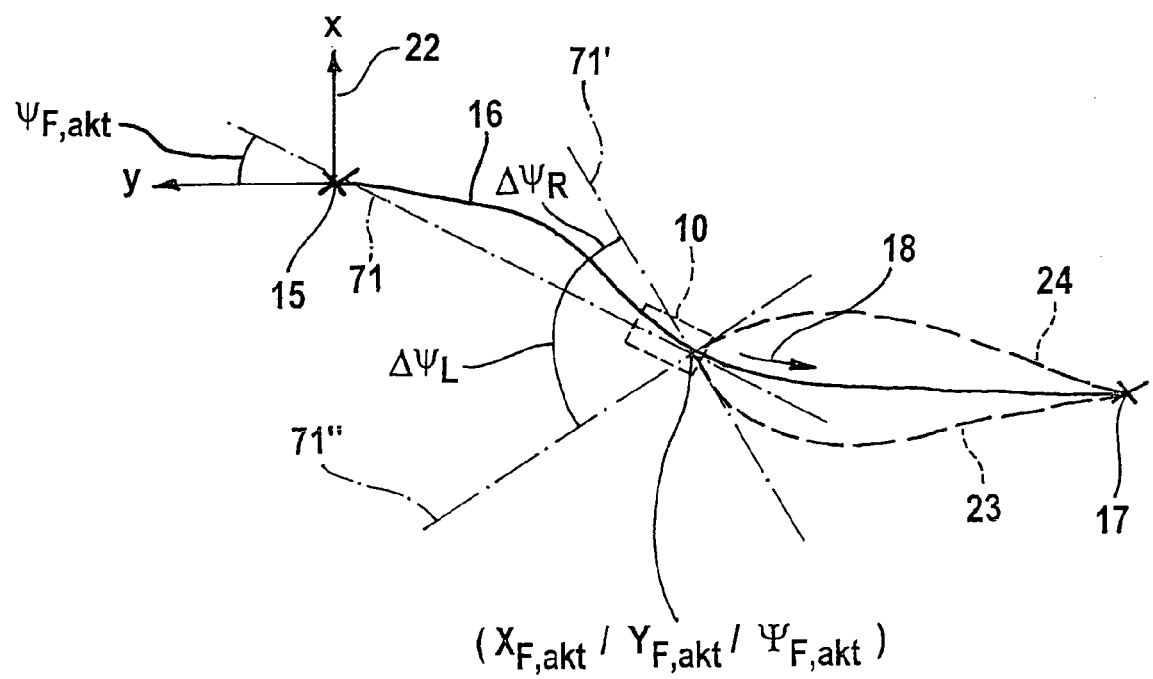
Figure 6B:
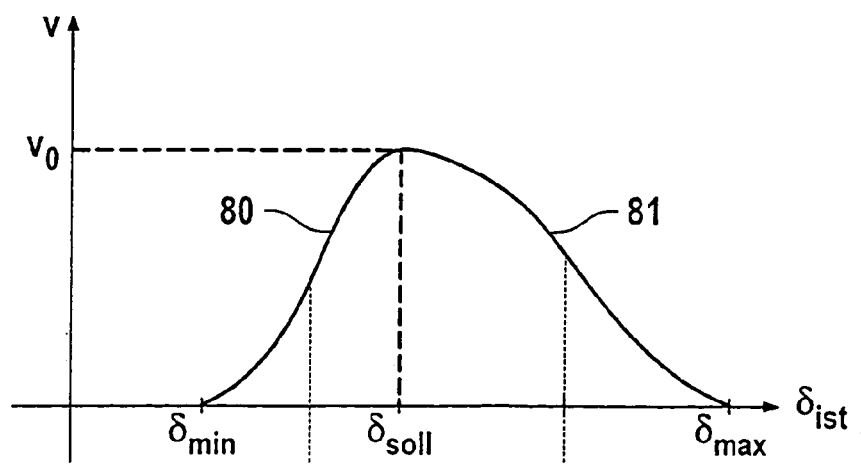
Figure 7:
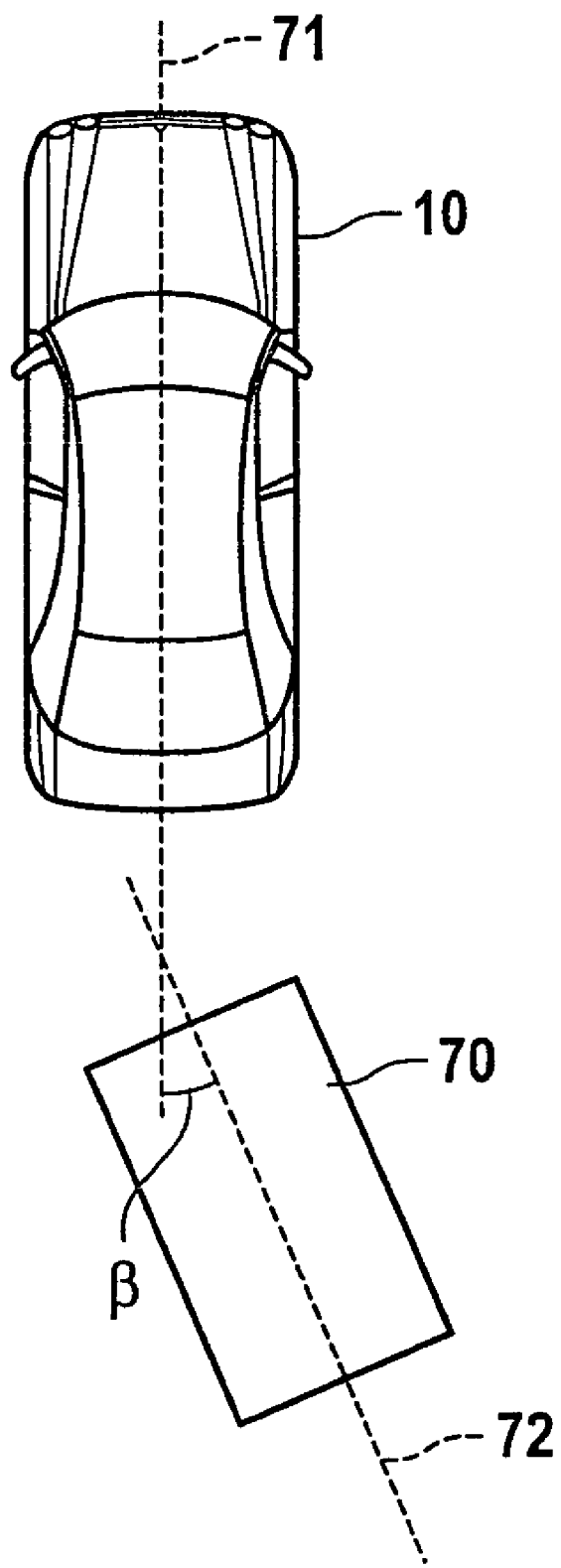

In the following text, the invention will be explained in more detail by using the appended drawings, in which:

FIG. 1 shows a schematic representation of a desired trajectory and the limiting trajectories for a parking maneuver in plan view, FIG. 2 shows a representation in a manner of a block diagram of an exemplary embodiment of a device for assisting the driver when performing a driving maneuver, FIGS. 3a–3c show a first embodiment of an optical display for the steering wheel position to be set for the driver, FIG. 4 shows a second embodiment of an optical display for the steering wheel position to be set for the driver, FIG. 5 shows a third embodiment of an optical display for the steering wheel position to be set for the driver, FIG. 6a shows a reference trajectory and the limiting trajectories at a specific time during a driving maneuver, FIG. 6b shows a graph relating to the situation illustrated in FIG. 6a, the vehicle longitudinal speed v being plotted as a function of the actual steering angle $\delta_{act}$, and FIG. 7 shows a schematic representation of a vehicle in trailer operation in plan view.

The invention concerns a method and a device for assisting the driver of a vehicle 10 when performing or during a driving maneuver. Such a driving maneuver can be, for example, a parking maneuver, a shunting maneuver or the like, it being possible for the vehicle 10 to be operated in solo operation or in trailer operation with attached trailer. For instance, the driver can also be assisted when driving straight backward in trailer operation.

During parking maneuvers, first of all, by means of a suitable sensor system, for example by means of ultrasonic sensors units 11, during forward travel of the vehicle 10, parking gaps can be measured and evaluated to see whether the parking gap is sufficiently large for a parking maneuver. In the exemplary embodiment according to FIG. 2, four ultrasonic sensor units 11 are provided for this purpose, it being possible for each to be arranged in a corner region of the vehicle 10. The number of ultrasonic sensors 11 present is as desired and depends in particular on how large the emission angle α is at which the sensor waves are emitted and the reflected waves are received. As an alternative to the ultrasonic sensor units 11, radar sensors or laser sensors can also be employed.

The evaluation of the sensor data from the ultrasonic sensor units 11 is carried out in an evaluation unit 12, in which it is established whether the measured parking gap is sufficiently large to park the vehicle. The evaluation result can be displayed to the driver by a display device 13.

The measurement of the parking gaps and the evaluation of the measured results can either be carried out continuously below a predefinable speed threshold or, alternatively, only when the driver has entered a corresponding request, for example via the combined instrument.

If a sufficiently large parking gap has been determined, then the driver can initiate the assistance method according to the invention by means of an appropriate operating request. One possibility, after a suitable parking gap has been found, is to ask the driver automatically—for example via the combined instrument—whether he wishes to have parking assistance. The driver then merely needs to confirm the question to activate the assistance method according to the invention. Another possibility is that, after a suitable parking gap has been found, the assistance method is activated automatically when the vehicle is stopped within a predefinable time interval and the reverse gear is selected.

FIG. 1 shows a typical situation for a parking maneuver of a vehicle 10 at the edge of a road 20 between other parked vehicles 21. The vehicle 10 has traveled along the road 20 along the row of parked vehicles 21 and, as it travels past, has determined that there is a sufficiently large parking gap 22, by means of the ultrasonic sensor units 11 and the evaluation device 12. This has been communicated to the driver via the display device 13 and he has stopped the vehicle.

Depending on the starting position 15 of the vehicle 10 assumed at the start of the driving maneuver, a reference trajectory 16 which represents the ideal line in order to move the vehicle into a target or parked position 17, starting from its starting position 15, is determined in the evaluation device 12. The reference trajectory 16 thus represents the ideal route to be covered, which leads from the starting position 15 into the target position 17.

Methods for determining the reference trajectory 16 are known, for example from DE. 29 01 504 B1, DE 38 13 083 A1 or DE 199 40 007 A1. At this point, reference is made expressly to the known methods for determining the reference trajectory 16.

During the determination of the reference trajectory, the minimum distances (such as minimum distance in the vehicle longitudinal direction, minimum distance in the vehicle transverse direction) which the vehicle to be moved along the reference trajectory has to maintain from obstacles can be varied on the basis of the length of the parking gap found. This means for example that the minimum distances to obstacles can be chosen to be larger, the longer the parking gap is. As a result, during parking, the greatest possible clearance can be ensured for the driver, in order to make the tolerable deviations of the actual vehicle position from the reference trajectory as large as possible. This increases the convenience for the driver.

Before the start of the driving maneuver, with the vehicle 10 in the starting position 15, the driver is automatically asked whether he desires assistance for the following parking maneuver, it being possible for the driver to reject or accept the assistance by means of an appropriate entry.

If the driver requests the automatic assistance in accordance with the method of the invention for the driving maneuver, the steering wheel position to be set or the steering wheel angle to be set, which would move the vehicle along the actual reference trajectory 16, is displayed to him via the display device 13.

Various examples of optical displays which can be displayed to the driver via the display device 13 are indicated in FIGS. 3–5. The first exemplary embodiment of an optical display according to FIGS. 3a–3c is a type of bar display. A left-hand bar 25 indicates when the steering wheel is to be rotated to the left and a right-hand bar 26 indicates when the driver is to rotate the steering wheel to the right. The greater the steering wheel angle which the driver has to set, the larger also is the displayed left-hand bar 25 or the right-hand bar 26. In the exemplary embodiment, the two bars 25, 26 are formed by a plurality of light-emitting means, for example light-emitting diodes, located horizontally beside one another. The more light-emitting diodes of a bar 25, 26 which light up, the greater the requested steering wheel angle. It goes without saying that, alternatively, the type of bar display could also be represented by an LC display, not specifically illustrated, belonging to the display device 13. It would also be possible to use as the display device 13 the bar display which is already present in current vehicles and displays the distance from an obstacle during parking.

In FIG. 3a the respective first light-emitting diode 27 of the two bars 25, 26, which is arranged adjacent to the respective other bar 26 or 25, lights up. In FIG. 3 the light-emitting diodes 27 that light up are represented schematically by a dot pattern. If the first light-emitting diode 27 of the two bars 25, 26 lights up in each case, this signals to the driver that he is to maintain the currently set steering wheel angle unchanged. As an alternative to this, an individual zero-point light-emitting diode could also be provided between the two bars 25, 26 and light up when the steering wheel position is to remain unchanged.

In FIG. 3b, by means of two light-emitting diodes of the left-hand bar 25 lighting up, it is indicated to the driver that he is to rotate the steering wheel slightly to the left. As soon as the requested steering wheel position has been reached, the display illustrated and described above in FIG. 3a appears again. In FIG. 3c, by means of four light-emitting diodes of the right-hand bar 26 lighting up, a higher steering wheel lock to the right is requested of the driver.

The number or light-emitting diodes 27 which form a bar 25, 26 can in principle be chosen as desired and is coordinated in such a way that the driver can be given a sufficiently fine subdivision in the requirement for the steering wheel position to be set. According to the example, each bar 25, 26 contains five light-emitting diodes 27.

By means of the display device 13, additionally or alternatively, further displays which indicate to the driver the steering wheel position to be set can also be displayed. By way of example, FIG. 4 shows a stylized steering wheel representation 30 in combination with a direction arrow 31, which can be communicated to the driver via an LC display belonging to the display device 13, the steering wheel representation 30 and the direction arrow 31 indicating the requested direction of rotation or the requested steering wheel angle. In FIG. 4 a slight steering wheel lock to the right is requested of the driver via the steering wheel representation 30 and the direction arrow 31.

A further embodiment of an optical display for requesting a steering wheel position to be set is shown in FIG. 5. There, the vehicle wheels 34 of the steerable front axle 35 are illustrated schematically. The wheel position represented by the continuous lines is the actual wheel position 36 of the vehicle wheels 34, while the dashed illustration indicates the requested desired position 37 of the steered vehicle wheels 34. Accordingly, the driver must displace the steering wheel into a position in which the desired position 37 of the vehicle wheels 34 coincides with the actual wheel position 36.

It goes without saying that, instead of the different illustration of desired position 37 and actual wheel position 36 of the vehicle wheels 34 by lines, different colors can also be chosen, if the display device 13 has a color LC display.

It is not just possible to use one or more of the optical display possibilities described in order to specify the steering wheel position to be set to the driver, but, furthermore, alternatively or additionally, acoustic driver information and/or tactile driver information which specifies the steering wheel angle to be set can be provided.

The acoustic driver information can be provided, for example, by means of a speech output via loudspeakers in the vehicle, not specifically illustrated. Tactile driver information in the exemplary embodiment is provided by using force or torque feedback on the steering wheel 40. For this purpose, the evaluation device 12 is connected to a servo motor 41 of the power steering system 42 in order to drive the latter, as indicated in FIG. 2 by the dash-dotted line 43. Thus, the steering wheel torque at the steering wheel 40 can be varied by the evaluation device 12 via the servo motor 41 for the purpose of tactile driver information about the steering wheel angle to be set. It is possible in this case to increase the steering wheel torque to be applied by the driver for a direction of rotation away from the requested steering wheel position and/or to reduce the steering wheel torque to be applied by the driver in a position of rotation toward the requested steering wheel position. Consequently, the driver can experience, through the steering wheel torque to be applied, the direction of rotation in which he must move the steering wheel in order to set the requested steering wheel position by which means tactile driver information for indicating the steering wheel position to be set is implemented.

During the driving maneuver, depending on the respective actual vehicle position $x_{F,act}/y_{F,act}/\psi_{F,act}$ the positional deviation of the vehicle 10 from that determined by the reference trajectory 16, and displayed to the driver by means of the display device 13, the steering wheel position to be set which reduces the positional deviation is displayed, so that the vehicle is again brought on to a travel route corresponding to the reference trajectory. As an alternative to this, it is in principle also possible to control out the positional deviation automatically.

The actual vehicle position $x_{F,act}/y_{F,act}/\psi_{F,act}$ of the vehicle 10 is to be understood not just as the vehicle position $x_{F,act}/y_{F,act}$ in the coordinate plane in relation to a stationary coordinate system 22 of the road 20; instead the vehicle position also includes the alignment of the vehicle longitudinal axis 71 in relation to the coordinate system 22. According to the example, the rotational angle $\psi_F$ is formed between the y axis of the coordinate system 22 and the vehicle longitudinal axis 71. The desired rotational angle consequently corresponds to the tangent to the reference trajectory 16.

At the start and during the driving maneuver, in the direction of travel 18 of the driving maneuver, a right-hand limiting trajectory 23 and a left-hand limiting trajectory 24 are additionally calculated in the evaluation device 12. The limiting trajectories 23, 24 depend on the actual vehicle position $x_{F,act}/y_{F,act}/\psi_{F,act}$. As viewed in the direction of travel 18 of the driving maneuver, they indicate the two trajectories along which the vehicle 10 can still just be steered to the target position 17 from the actual vehicle position $x_{F,act}/y_{F,act}$. The right-hand limiting trajectory 23 is obtained by successively increasing the actual rotational angle $\psi_{F,act}$—in the mathematically positive sense—as far as an upper limiting rotational angle $\psi_{F,max}$, with which a trajectory, the right-hand limiting trajectory 23, to the target position 17 can still just be calculated. In this case, the values of the actual vehicle position $x_{F,act}/y_{F,act}$ remain unchanged.

The lower limiting rotational angle $\psi_{F,min}$ is determined in an analogous way by the actual rotational angle $\psi_{F,act}$ being reduced successively until the left-hand limiting trajectory 24 to the target position 17 can still just be determined.

This results in the following equations:

$$\psi_{F,max} = \psi_{F,act} + \Delta\psi_L \text{ and}$$

$$\psi_{F,min} = \psi_{F,act} - \Delta\psi_R$$

where $\Delta\psi_L$ indicates the value by which the actual angle of rotation has been increased, and $\psi\Delta_R$ indicates the value by which the actual angle of rotation has been reduced in order to obtain the relevant limiting rotational angle.

These limiting trajectories 23, 24 are determined, for example, by the algorithm used to calculate the reference trajectory 16. According to the example, the limiting trajectories 23, 24 are determined cyclically during the driving maneuver. In order to reduce the computational effort, one limiting trajectory 23 or 24 is calculated during a computational cycle and the respective other limiting trajectory 24 or 23 is calculated during the following computational cycle. The accuracy in this procedure is completely adequate. As compared with the algorithm used for determining the reference trajectory, further simplifications can be permitted in order to reduce the computational effort. For instance, the limiting trajectories can be assembled simply from path curves, such as circular sections, which require less computational effort.

By using FIGS. 6a and 6b, the following text will explain how the vehicle longitudinal speed v is influenced if a steering angle deviation $d_{LW}$ occurs between the actual steering angle $\delta_{act}$ actually set by the driver and the steering wheel position requested and to be set corresponding to the desired steering angle $\delta_{des}$.

At the time being considered, the vehicle 10 is in the actual vehicle position which is described by the values $x_{F,act}/y_{F,act}/\psi_{F,act}$ in relation to the coordinate system 22 of which the origin is located in the starting position 15. By using this actual vehicle position $x_{F,act}/y_{F,act}/\psi_{F,act}$, the determination of the upper limiting rotational angle $\psi_{F,max}$ and of the lower limiting rotational angle $\psi_{F,min}$ will be explained.

The actual vehicle position $x_{F,act}/y_{F,act}$ remains unchanged during the determination of the two limiting angles of rotation $\psi_{F,max}$, $\psi_{F,min}$. The vehicle 10 is, so to speak, rotated virtually about its vertical axis in this position until the relevant limiting rotational angle is reached from which it is still just possible to determine a trajectory— which means a possible travel path of the vehicle 10—specifically the relevant limiting trajectory 23 or 24 to the target position 17.

First of all, assume that the vehicle is rotated to the right about its vertical axis (in the mathematically negative sense) until the actual rotational angle $\psi_{F,act}$ is reduced by $\Delta\psi_R$, so that the vehicle longitudinal axis assumes the position designated 71' in FIG. 6a. The vehicle longitudinal axis 71' forms the lower limiting rotational angle $\psi_{F,min}$ with the y axis of the coordinate system 22. The right-hand limiting trajectory 23 resulting in this vehicle position, as viewed in the direction of travel 18 of the driving maneuver, is illustrated in FIG. 6l.

Equally, the vehicle 10 can be rotated virtually to the left (in the mathematically positive sense) about its vertical axis in its actual vehicle position until the left-hand limiting trajectory 24 to the target position 17 is still just possible.

The actual rotational angle $\psi_{F,act}$ has in this case been enlarged by $\Delta\psi_L$, so that between the vehicle longitudinal axis, designated by 71" in this rotational position, and the y axis of the coordinate system 22, the upper limiting rotational angle $\psi_{F,max}$ results. In this way, a rotational angle tolerance band between the lower limiting rotational angle $\psi_{F,min}$ and the upper limiting rotational angle $\psi_{F,max}$ is calculated.

This rotational angle tolerance band is then used for determining the vehicle longitudinal speed v by using a function f which, in principle, can be selected as desired. In this case, the vehicle longitudinal speed v depends on the steering angle deviation $d_{LW}$.

In FIG. 6b an example of the dependence of the vehicle longitudinal speed v on the actual steering angle $\delta_{act}$ is plotted. If, via the steering wheel position, the vehicle driver sets an actual steering angle $\delta_{act}$ which coincides with the desired steering angle $\delta_{des}$ to be set, the vehicle longitudinal speed is $v = v_0$. This point represents the vertex of a Gauss curve in the example according to FIG. 6b. This is formed asymmetrically with respect to a parallel to the v axis through the vertex of the Gauss curve. According to the example, each of the two curve sections 80 and 81 resulting from dividing the Gauss curve at the vertex depends on the rotational angle difference $\Delta\psi_R$ or $\Delta\psi_L$ between the actual rotational angle $\psi_{F,act}$ and the corresponding upper or lower limiting rotational angle $\psi_{F,max}$ or $\psi_{F,min}$. The first curve section 80 between the desired steering angle $\delta_{des}$ toward the smaller actual steering angle $\delta_{act}$ is determined such that the standard deviation corresponds to the rotational angle difference $\Delta\psi_R$ between the lower limiting rotational angle $\psi_{F,min}$ and the actual vehicle rotational angle $\psi_{F,act}$. In an analogous way, the second curve section 81 starting from the desired steering angle $\delta_{des}$ toward larger actual steering angles $\delta_{act}$ is determined such that the standard deviation of this second curve section 81 corresponds to the rotational angle difference $\Delta\psi_L$ between the upper limiting rotational angle $\psi_{F,max}$ and the actual vehicle rotational angle $\psi_{F,act}$.

These two curve sections 80, 81 then result in a minimum permissible actual steering angle $\delta_{min}$ and a maximum permissible actual steering angle $\delta_{max}$. As can be seen from FIG. 6b, the difference between the desired steering angle $\delta_{des}$ and the minimum permissible actual steering angle $\delta_{min}$ is smaller than the difference between the maximum permissible actual steering angle $\delta_{max}$ and the desired steering angle $\delta_{des}$. Accordingly, the vehicle longitudinal speed v in the event of a deviating actual steering angle $\delta_{act}$ which is smaller than the desired steering angle $\delta_{des}$ is reduced to a greater extent than would be the case in the event of a corresponding deviation from the desired steering angle $\delta_{des}$ toward greater actual steering angles $\delta_{act}$.

This can clearly be explained in that, in the event of a change in the vehicle rotational angle in the mathematically positive sense, a greater tolerance band is available then if the actual vehicle rotational angle were changed in the mathematically negative sense (cf. FIG. 6a).

As soon as the driver sets an actual steering angle $\delta_{act}$ which, as the vehicle 10 travels onward, would lead to the vehicle 10 assuming a vehicle position from which no trajectory to the target position 17 can be found, the vehicle is brought to a standstill. The vehicle is then accelerated again, independently of the driver, only if the driver sets an actual steering angle $\delta_{act}$ which lies between the minimum permissible actual steering angle $\delta_{min}$ and the maximum permissible actual steering angle $\delta_{max}$.

In a particularly advantageous refinement, a renewed calculation of the reference trajectory is carried out each time the vehicle has automatically been retarded to a standstill.

As an alternative to the use of a Gauss function, a triangular function or any other desired curved shape with the vertex $\delta_{des}/v_0$ could also be used. This function can in particular be determined empirically in driving trials in order to set the desired driving feel.

In the exemplary embodiment, the vehicle longitudinal speed v is regulated on the basis of the actual steering angle $\delta_{act}$ or the steering angle deviation $d_{LW}$. This is carried out by activating retardation means 50 and/or forward drive means 51 of the vehicle 10.

In the exemplary embodiment according to FIG. 2, the retardation means 50 are formed by a braking device 52 which a brake control unit 53 and wheel braking devices 54 activated by this brake control unit 53, which are assigned to the vehicle wheels 55 of the rear axle of the vehicle, and wheel braking devices 56, which are assigned to the vehicle wheels 34 of the front axle 35 of the vehicle 10. In order to activate the braking device 52, the evaluation device 12 is connected to the brake control unit 53. Consequently, if the actual desired trajectory 19 approaches one of the limiting trajectories 23, 24, the evaluation device 12 activates the brake control unit 53, which in turn acts on one or more of the wheel braking devices 54, 56.

As an alternative to speed regulation, the vehicle longitudinal speed v can merely being reduced by bringing about a braking pressure, without regulating the speed to a desired value, starting from the maximum speed $v_0$, which can be about 5 km/h, in the event of there being a steering angle deviation $d_{LW}$.

For the purpose of the vehicle retardation, alternatively to or simultaneously with the activation of the braking device 52, the forward drive means 51 are activated. For this purpose, the evaluation device 12 is connected to the engine control device 60, illustrated schematically in FIG. 2, which here symbolizes the forward drive means 51. For reasons of clarity, the complete drive train with engine control device 60, the vehicle engine, the transmission, the drive shaft and so on, have not been illustrated.

The method according to the invention can also be used in a modified form for driving maneuvers of the vehicle 10 with a trailer 70. In this case, alternatively or additionally to influencing the vehicle longitudinal speed v on the basis of the steering angle deviation $d_{LW}$, the vehicle longitudinal speed v can also be influenced on the basis of the trailer angle deviation between a desired trailer angle $\beta_{des}$ and an actual trailer angle $\beta_{act}$. The trailer angle $\beta$ is formed between the vehicle longitudinal axis 71 and the trailer longitudinal axis 72 (see FIG. 7). For reasons of improved clarity, the trailer coupling and the trailer towbar for connecting the vehicle 10 to the trailer 70 are not illustrated in FIG. 7.

In the case of trailer operation, each vehicle position of the vehicle 10 to be passed through along the reference trajectory 16 is assigned a corresponding desired trailer angle $\beta_{des}$. The simplest example would be the movement of the vehicle 10 with the trailer 70 straight backward, so that the desired trailer angle $\beta_{des}$ is equal to zero during the entire driving maneuver.

The vehicle 10 has means for determining the desired trailer angle $\beta_{des}$, which, according to the example, are contained in the evaluation device 12. Furthermore, the vehicle 10 and/or the trailer 70 has/have means, not specifically illustrated here, for determining the actual trailer angle $\delta_{act}$. For example, the trailer angle between a vehicle 10 and trailer 70 can be registered by means of trailer angle sensors known per se.

During the driving maneuver, the steering wheel position which the driver has to set in order that the actually registered trailer angle $\beta_{act}$ corresponds to the desired trailer angle $\beta_{des}$ is now displayed to the driver. If the actual trailer angle $\beta_{act}$ deviates from the desired trailer angle $\beta_{des}$, the retardation means 50 and/or the forward drive means 51 of the vehicle 10 are activated independently of the driver in order to reduce the vehicle longitudinal speed v. The greater the trailer angle deviation between the actual trailer angle $\beta_{act}$ and the desired trailer angle $\beta_{des}$, the greater is the braking force or the braking pressure p or the vehicle retardation brought about automatically. It is also possible to regulate the longitudinal speed of the vehicle v on the basis of the trailer angle deviation between the desired trailer angle $\beta_{des}$ and the actual trailer angle $\beta_{act}$, the desired speed $\beta_{des}$ being lower, the greater the trailer angle deviation between actual trailer angle $\beta_{act}$ and desired trailer angle $\beta_{des}$.

The assistance method for driving maneuvers in trailer operation on the basis of the trailer angle $\beta$ can also be carried out independently of the determination of a reference trajectory. For example, in the case of a driving maneuver straight backward with trailer 70, it is possible for only the trailer angle deviation between the desired trailer angle $\beta_{des}$ and the actual trailer angle $\beta_{act}$ to be taken into account in the requirement of the steering wheel angle to be set and the activation of the retardation means 50 and/or forward drive means 51.

If, during more complex driving maneuvers in trailer operation, each position of the vehicle 10 and of the trailer 70 along the reference trajectory is assigned a corresponding desired trailer angle $\beta_{des}$, then the feedback from the driver about the steering wheel angle to be set and the automatic activation of the retardation means 50 and/or forward drive means 51 takes into account both the steering angle deviation $d_{LW}$ and the trailer angle deviation.

The invention claimed is:

1. A method for assisting the driver of a vehicle (10) when performing a driving maneuver formed by a parking or shunting maneuver, a reference trajectory (16) corresponding to the driving maneuver being determined, along which the vehicle (10) is to be moved, and the steering wheel position to be set in each case and controlling the vehicle (10) along the reference trajectory (16) being indicated to the driver during the driving maneuver, the vehicle longitudinal speed (v) being influenced independently of the driver in the event of a steering angle deviation ($d_{LW}$) between the actual steering angle ($\delta_{act}$) actually set by the driver and the desired steering angle ($\delta_{des}$) corresponding to the requested steering wheel position, characterized in that the vehicle longitudinal speed is influenced on the basis of the magnitude of the steering angle deviation ($d_{LW}$) in such a way that a greater vehicle retardation is carried out, the greater the magnitude of the steering angle deviation ($d_{LW}$) is.

2. The method as claimed in claim 1, characterized in that, during the driving maneuver, depending on the current vehicle position ($x_{F,act}/y_{F,act}/\psi_{F,act}$), a steering angle tolerance band ($\delta_{min}$ to $\delta_{max}$) which determines the permissible steering angle is determined and the influence on the vehicle longitudinal speed (v) depends on the tolerance margin ($\delta_{des}-\delta_{min}$ or $\delta_{max}-\delta_{des}$) between the desired steering angle ($\delta_{des}$) and the tolerance band limits ($\delta_{min}$ or $\delta_{max}$).

3. The method as claimed in claim 2, characterized in that, in order to determine the steering angle tolerance band, a rotational angle tolerance band is determined, the actual rotational angle ($\psi_{F,act}$) between the vehicle longitudinal axis (71) and a coordinate axis (y) of a stationary coordinate system (22) being enlarged or reduced until it is just still possible to determine a trajectory to the target position (17).

4. The method as claimed in claim 2, characterized in that the vehicle longitudinal speed (v) is chosen to be lower, the smaller the magnitude of the tolerance margin (67 $_{des}-\delta_{min}$ or $\delta_{max}-\delta_{des}$).

5. The method as claimed in claim 1, characterized in that the vehicle longitudinal speed (v) is chosen to be lower, the greater the magnitude of the steering angle deviation ($d_{LW}$).

6. The method as claimed in claim 1, characterized in that the vehicle longitudinal speed is influenced by means of speed regulation.

7. The method as claimed in claim 1, characterized in that the vehicle (10) is retarded down to a standstill and is kept at a standstill as long as, on the basis of the existing steering angle deviation ($d_{LW}$), the vehicle (10) would assume a vehicle position during onward travel from which the target position (17) can no longer be reached without a shunting interruption to the driving maneuver.

8. The method as claimed in claim 7, characterized in that the vehicle (10) is accelerated again independently of the driver if the driver sets a steering wheel position which leads to a permissible steering angle deviation ($d_{LW}$).

9. The method as claimed in claim 1, characterized in that the steering wheel position to be set is indicated by means for acoustic driver information and/or means for optical driver information (13) and/or means for tactile driver information (40 and 41).

10. The method as claimed in claim 9, characterized in that the means for tactile driver information (40 and 41) have means for changing the steering wheel torque to be applied by the driver.

11. The method as claimed in claim 1, characterized in that the driving maneuver is a parking maneuver and the reference trajectory (16) indicates the ideal route from the actual vehicle position ($x_{F,act}/y_{F,act}/\psi_{F,act}$) into the parking position (17).

12. The method as claimed in claim 1, characterized in that, in the case of a vehicle (10) in trailer operation, each vehicle position along the actual reference trajectory (16) is assigned a desired trailer angle ($\beta_{des}$) between the vehicle longitudinal axis (71) and the trailer longitudinal axis (72), and in that the actual trailer angle ($\beta_{act}$) is determined and compared with the corresponding desired trailer angle ($\beta_{des}$), the vehicle longitudinal speed (v) being influenced independently of the driver in the event of an angular deviation between desired trailer angle ($\beta_{des}$) and actual trailer angle ($\beta_{act}$).

13. A device for implementing a method for assisting a driver of a vehicle when performing a driving maneuver formed by a parking or shunting maneuver, having means (12) for determining a reference trajectory (16) along which the vehicle (10) is to be moved corresponding to the driving maneuver, means (13; 40 and 41) for indicating the steering wheel position to be set by the driver and controlling the vehicle (10) along the reference trajectory (16), an evaluation device, and retardation means (50) and/or forward drive means (51) for influencing the vehicle longitudinal speed (v), wherein the retardation means (50) and/or forward drive means (51) can be activated independently of the driver if a steering angle deviation ($d_{LW}$) between the actual steering angle ($\delta_{act}$) actually set by the driver and the desired steering angle ($\delta_{des}$) corresponding to the requested steering wheel position is established in the evaluation device (12), characterized in that the vehicle longitudinal speed is influenced on the basis of the magnitude of the steering angle deviation ($d_{LW}$) in such a way that a greater vehicle retardation is carried out, the greater the magnitude of the steering angle deviation ($d_{LW}$) is.

14. The device as claimed in claim 13, characterized in that means (12) are provided for determining the desired trailer angle ($\beta_{des}$) between the vehicle longitudinal axis (71) and a trailer longitudinal axis (70) of a trailer being towed by the vehicle, and means for determining the actual trailer angle ($\beta_{act}$), in that the evaluation device (12) compares the desired trailer angle ($\beta_{des}$) and the actual trailer angle ($\beta_{act}$), and in that the retardation means (50) and/or forward drive means (51) of the vehicle (10) are activated in the event of an angular deviation being established between the desired trailer angle ($\beta_{des}$) and the actual trailer angle ($\beta_{act}$).

* * * * *

UNITED STATES PATENT AND TRADEMARK OFFICE
CERTIFICATE OF CORRECTION

PATENT NO. : 7,089,101 B2
APPLICATION NO. : 10/522038
DATED : August 8, 2006
INVENTOR(S) : Fischer et al.

It is certified that error appears in the above-identified patent and that said Letters Patent is hereby corrected as shown below:

<u>Column 1,</u>
Between lines 6 and 7, insert an additional paragraph as follows:
--Such a method is known from FR 2 758 383 A1. In order to park, a trajectory from a starting to a target position, having turning points or turning zones, is calculated there. If the vehicle, in traveling along the trajectory, is located at such a turning point or in such a turning zone, the vehicle is retarded or stopped. The vehicle can be kept at a standstill until the driver has set the steering angle which is predefined by the next section of the trajectory as far as the next turning point, as viewed in the direction of travel.--;

Line 7, replace "such a method emerges, for example, from" by --Furthermore,--;
Line 8, after "416 A1" delete ", which";

Line 41, after "wheel position", insert
--In this case, the influence on the vehicle longitudinal speed depends on the magnitude of the steering angle deviation. The greater the steering angle deviation, the more intensely will the vehicle be retarded in order to reduce the vehicle longitudinal speed.--;

<u>Column 1,</u>
Lines 51 to 55, delete this paragraph.

<u>Column 3,</u>
Line 21, after "trajectory", delete --and the limiting trajectories--.

<u>Column 4,</u>
Line 36, after "DE", (first occurrence) delete --.--.

<u>Column 6,</u>
Line 14, after "by the", delete "dash-dotted" and insert --dashed--;
Line 22, after "in a", delete "position" and insert --direction--;
Line 27, after "position", insert --,--.

<u>Column 7,</u>
Line 12, after "and", delete "$\Psi\Delta_R$" and insert --$\Delta\Psi_R$--;
Line 27, after "can", insert --merely--;
Line 63, after "in", delete "FIG. 61." and insert --figure 6a--.

UNITED STATES PATENT AND TRADEMARK OFFICE
CERTIFICATE OF CORRECTION

PATENT NO. : 7,089,101 B2
APPLICATION NO. : 10/522038
DATED : August 8, 2006
INVENTOR(S) : Fischer et al.

It is certified that error appears in the above-identified patent and that said Letters Patent is hereby corrected as shown below:

Column 9,
Line 17, after "which", insert --comprises--;
Lines 23 to 27, after "53.", delete "Consequently, if the actual desired trajectory 19 approaches one of the limiting trajectories 23, 24, the evaluation device 12 activates the brake control unit 53, which in turn acts on one or more of the wheel braking devices 54, 56."

Column 11,
Line 10, after "margin ", delete " (67" and insert --(δ--.

Signed and Sealed this

Sixth Day of March, 2007

JON W. DUDAS
*Director of the United States Patent and Trademark Office*